United States Patent

[11] 3,587,097

| [72] | Inventor | Keefer S. Stull, Jr.<br>Baltimore, Md. |
|---|---|---|
| [21] | Appl. No. | 599,030 |
| [22] | Filed | Dec. 5, 1966 |
| [45] | Patented | June 22, 1971 |
| [73] | Assignee | Westinghouse Electric Corporation<br>Pittsburgh, Pa. |

[54] SIGNAL RETRIEVAL SYSTEM WITH CONTINUOUS CONTROL OF DETECTION THRESHOLD LEVEL
12 Claims, 3 Drawing Figs.

[52] U.S. Cl. ........................................................... 343/7 A,
324/77 E, 343/7.7, 343/8
[51] Int. Cl. ....................................................... G01r 23/00,
G01s 9/42, G01s 9/44
[50] Field of Search ........................................... 343/7.7, 8,
7 RS; 324/77 E

[56] References Cited
UNITED STATES PATENTS
3,103,009  9/1963  Bayer ............................ 343/8 X

*Primary Examiner*—Malcolm F. Hubler
*Attorneys*—F. H. Henson, E. P. Klipfel and J. L. Wiegreffe

ABSTRACT: This invention provides a special spectrum analyzer especially adapted to be used in connection with a Doppler radar system. The analyzer comprises a bank of contiguous filters connected to the radar receiver which are utilized to discriminate between targets having different Doppler frequency shifts. The output of each filter is amplified, detected, and integrated. The various integrator voltages are then compared to a reference voltage which helps eliminate error due to noise, to determine if a target is present.

| NUMBER OF REFERENCE CHANNELS | 1 | 2 | 4 | 8 | 12 | 20 | 30 | 50 |
|---|---|---|---|---|---|---|---|---|
| NOISE FIGURE INCREASE d.b. | 3.01 | 1.76 | 0.97 | 0.51 | 0.35 | 0.21 | 0.14 | .086 |

SIGNAL RETRIEVAL SYSTEM WITH CONTINUOUS CONTROL OF DETECTION THRESHOLD LEVEL

SIGNAL RETRIEVAL SYSTEM WITH CONTINUOUS CONTROL OF DETECTION THRESHOLD LEVEL

This invention relates to a signal translation system and more particularly to improvements in a signal translation system for retrieving information signal data dispersed in a wide spectrum of signal frequencies, including noise and other frequencies of random phase and amplitude.

This invention is more particularly directed to a signal detection, integration and level sensing system with a continuous control of the detection threshold level.

Although the invention is illustrated in connection with a system for retrieving pulse Doppler radar signal data from the Doppler echo power spectrum of a radar receiver, the invention is not so limited. Its adaptability to other signal translation systems will be apparent to those skilled in the art. For example, the system might be considered as a spectrum analyzer which could be made capable of detecting the various periodic components of different frequencies which are immersed in a wide spectrum of components of different fixed frequencies or nonperiodic signals of random phase and amplitude.

In coherent radar systems, using the Doppler shift phenomena the shift in frequency of the received signal is proportional to the radial velocity between the transmitting source and the target and if suitably measurable will become a source of information about a particular target parameter, such as range rate. The signal intelligence resides in the frequency component of the signal and not in its amplitude. In such systems, it is conventional to quantize the power spectrum of the radial signals along radial and angular coordinates. The angular quantization is a function of the antenna, while the quantization of radial coordinates must take place within the confines of an individual angular quanta.

Detection of signals in a power spectrum, including random noise, such as is introduced by all practical antennas and receivers, is materially aided by reducing the bandwidth of the channels through which the received signal passes before a detection decision is made. Although the Doppler echo return signals constitute a continuum of random frequencies, the center frequency is measurable to a satisfactory degree of resolution by using a large number of contiguous narrow bandwidth filters constituting fixed band channels covering the range of the Doppler frequency shift information which is of significance. The continuum of values of frequency may be quantized such that the bandwidth of one of the frequency channels is one quantum. This frequency channelizing coincides with the bandwidth reduction made necessary for signal detection.

In Doppler and pulse Doppler radar, the receiver output fed to the bank of contiguous filters is used to discriminate between targets having different Doppler frequency shifts due to the relative velocities. The output of each filter is amplified, detected and integrated. The various integrator output voltages are then sampled by high speed interrogation means and compared to a reference voltage to determine if a target is present. The problem is to set the reference voltage at a level that will permit not more than an acceptable number of false detections due to noise while maintaining maximum target detection sensitivity in all environments.

In copending application Ser. No. 64,372, filed Oct. 24, 1960 now U.S. Pat. No. 3,181,149 in the name of Irving I. Kaplan and Ralph J. Metz for "Signal Extraction Circuit and Method Employing Magnetic and Other Solid State Devices," copending application Ser. No. 260,050, filed Apr. 14, 1964 in the name of Irving I. Kaplan and Joseph G. Fay and another copending U.S. Pat. application Ser. No. 563,830 for "Signal Translation System," filed July 8, 1966 now U.S. Pat. No. 3,474,342 in the names of R. J. McGee and Ralph J. Metz, all of the above copending applications being owned by the assignee of the present invention, there is disclosed and claimed signal retrieval systems in which the received power frequency spectrum is separated into discrete segments by means of contiguous narrow band-pass filters having bandwidth with the range rate revolution desired. These band-pass filters are in channels which have components for performing the function of frequency quantization, predetection filtering, detection and postdetection integration. In all these prior systems, these contiguous frequency channels, which constitute the filter bank are a part of what may be called filter bank and interrogator units which include the filter detection units each having a demodulator, integrator means and readout means. The integrated signal power, plus the noise power in each channel, is compared with a reference voltage for making the target detection decision. Some of these prior systems utilize a fixed threshold reference voltage; others use a variable reference voltage which is responsive to certain environmental conditions. Total signal power, including noise, in the individual channels varies up and down as a function of time and therefore noise signals in some instances may be interpreted as a target signal. In other systems, some means is provided for varying the threshold reference voltage, such as an AGC control for each channel.

The present invention is directed to a system of the general type mentioned above for retrieving signal data from a wide power spectrum, of which those in the aforementioned copending patent applications are representative, and in which a constant false alarm feature is built into the system.

The features generally common to all of the prior systems can be described in terms of the block diagram of FIG. 1 in which the target signal channels $C_1$—$C_n$ comprise a bank of filters $F_1$—$F_n$ each with a selected bandwidth $B_S$; a bank of amplifiers $A_1$—$A_n$ each with a selected gain $G_S$; a bank of detectors $D_1$—$D_n$ ; and and a bank of postdetector integrators $PDI_1$—$PDI_n$ . A parallel reference channel $C_R$ is provided to produce the threshold reference voltage. The reference channel comprises a filter $F_R$ with a selected bandwidth $B_R$; an amplifier $A_R$ with a selected gain $G_R$; a detector $D_R$; and a conventional postdetector integrator $PDI_R$. In general, the bandwidth $B_R$ of the filter $F_R$ is much, much greater than the bandwidth $B_S$ of each of the signal channel filters $F_1$—$F_n$ ($B_R >> B_S$). This makes the gain $G_R$ through the amplifier $A_R$ much less than the gain $G_S$ through the signal amplifiers $A_1$—$A_n$ ($G_R << G_S$), so that very little noise appears on the reference voltage. The gain $G_R$ of the amplifier $A_R$ is adjusted to give the desired false alarm probability.

The frequency band of the reference channel filter $F_R$ should be out of the signal band to prevent strong signals from affecting the reference level. However, in some instances the reference voltage may be derived from the average of all of the signal outputs in which case strong signals will affect the reference level. The basic philosophy behind the system is that a change in noise level, whether due to external signal environment, such as jamming or due to internal effects, such as variations of receiver noise level or gain, will produce proportional changes in the output of the signal and reference channels and thus maintain a fixed threshold ratio as desired to maintain a fixed false alarm probability.

These prior systems perform satisfactory so long as the background "noise" is truly random in nature. However, to a coherent narrow band Doppler radar system most forms of incidental interference such as radar, telegraphy, AM, FM or pulse modulated communication signals will appear as impulses which are not random. The integrated value of an impulse is independent of the bandwidth of the channel through which it passes while the integrated value of random noise is proportional to the square root of the channel bandwidth. A properly designed system should be able to handle a combination of noise and impulses while maintaining a fixed false alarm probability. This can be accomplished if random noise raises the reference channel output by the same percentage that it raises the signal channel outputs, while impulses raise reference and signal channel outputs by the same absolute amount.

Accordingly, a primary object of the present invention is to provide a novel and improved signal retrieval system which is comparatively simple and yet will provide a substantially constant false alarm probability.

A more specific object is to provide a novel and improved signal retrieval system which provides a substantially constant false alarm probability by providing a reference signal which has a substantially constant ratio to the output of the signal channels in a noise environment.

A still further object is to provide a constant false alarm probability in a signal retrieval system when operating under a background environment of random noise or impulses, or a combination of the two.

Other and further objects will become apparent from the following description when taken in connection with the accompanying drawings, in which.

Generally speaking, the present invention provides a special spectrum analyzer especially adapted to be used in connection with a Doppler radar system. In this instance, the special spectrum analyzer retrieves the coherent Doppler information from the broad spectrum of echo signals which are received and processed by the receiver. The system comprises a bank of contiguous filters which are used to discriminate between targets having different Doppler frequency shifts due to the relative positions of the targets in the radiation pattern of the antenna. The output of each filter is amplified, detected and integrated. The various integrator voltages are then compared to a reference voltage to determine if a target is present. The present invention is particularly directed to the part of the system which provides a reference voltage at a level that will permit more than an acceptable number of false detections due to noise while maintaining the maximum target detection sensitivity in all environments.

Figure 1:
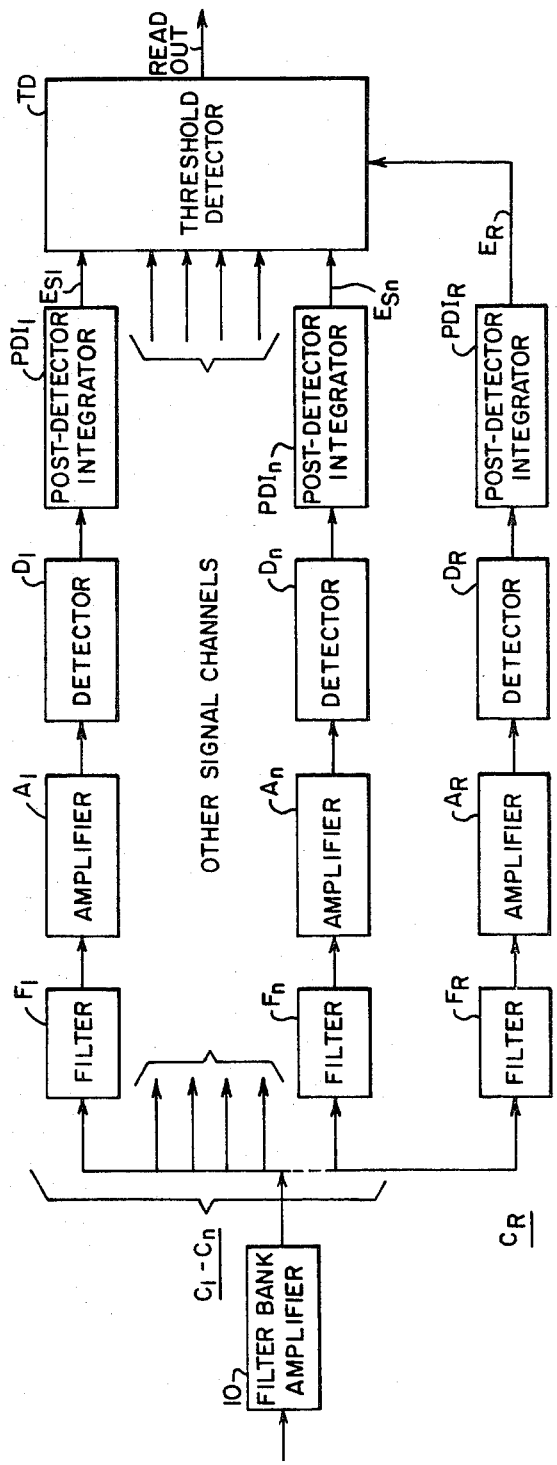
FIG. 1 is a schematic block circuit diagram of the prior art.

In presenting the present invention, reference is again made to the features common to the prior art, illustrated generally in block diagram in FIG. 1, so that the contrast of the present invention will be more clearly pointed out.

In the prior art systems various means have been utilized for providing a reference threshold voltage, the block diagram of FIG. 1 being an example of one in which the output of a conventional radar receiver is supplied through an amplifier 10 to a plurality of signal channels $C_1-C_n$ and a single reference channel $C_R$ which have been previously described briefly.

As previously mentioned, the integrated value of an impulse is independent of the bandwidth of the channel through which it passes and the integrated value of random noise is proportional to the square root of the bandwidth of the channel. Thus an opportunity is presented for maintaining a fixed false alarm probability in the presence of a combination of random noise and impulse signals but this was not recognized by the prior art in which only one reference channel was utilized. In accordance with this invention, a fixed false alarm probability is accomplished by means which causes the random noise to change the reference channel output by the same percentage that it raises the signal channel outputs while at the same time the signals having the characteristics of impulses increases the respective outputs of the signal and reference channels by the same absolute amount. A circuit, such as that in FIG. 1 will provide this desired performance if definite gain and bandwidth relations are maintained between the signal and reference channels. For example, in order for this circuit to satisfy the impulse requirements, the gain $G_R$ of the single reference channel must equal the gain $G_S$ of the signal amplifiers $A_1-A_n$. Then with random noise input only the threshold ratio $$T = (E_R/E_S) \quad (1)$$

where $E_R$ is voltage output of the reference channel and $E_S$ is the voltage output the signal channels can be maintained constant only if $$B_R = T^2 B_S. \quad (2)$$

This would be unsatisfactory with the single reference channel of FIG. 1 because there would be as much noise on the reference voltage output after integration as on the output of any signal channel integrator. This would be the equivalent to increasing the system noise by 3 db.

Figure 2:
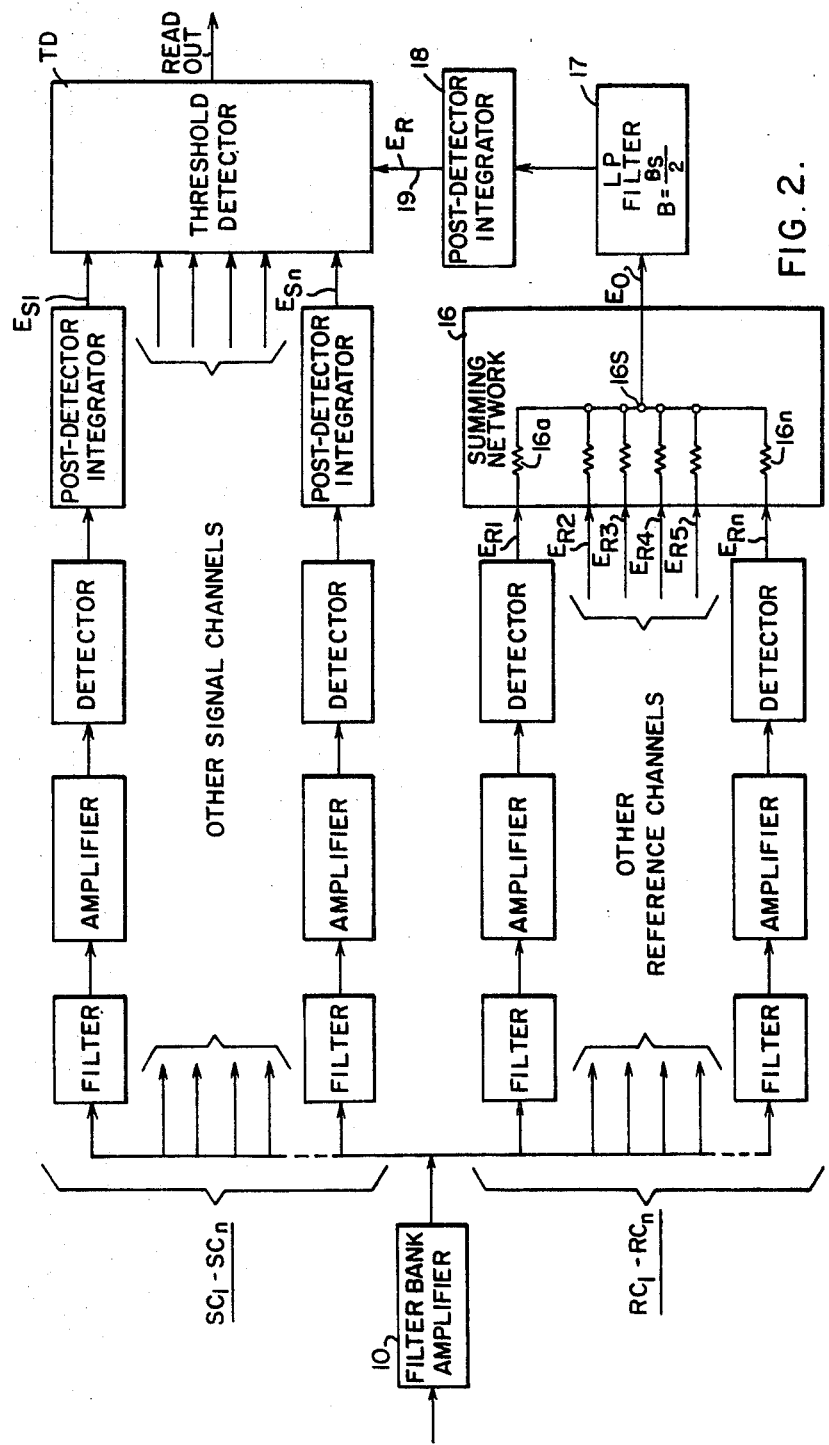
FIG. 2 is a schematic circuit block diagram of one embodiment of the present invention.

The first embodiment of the present invention, shown in FIG. 2, satisfies the impulse and noise requirements and allows the reference noise to be reduced to any practical arbitrary value by increasing the number of reference channels $RC_1-RC_{n3}$ each with a gain $G_R$ equal to the gain $G_S$ of the signal channels, $SC_1-SC_n$, to satisfy the impulse requirement and each with a bandwidth $B_R = T^2 B_S$ to satisfy the noise threshold requirement. In the second embodiment, illustrated in FIG. 3, continuous variable control of the threshold ratio is provided by varying the effective bandwidth of the reference channel filters. A further feature of this second embodiment is that this ratio can be changed by using fixed bandwidth filters while at the same time satisfying the requirement at any threshold setting for a constant false alarm probability.

As contrasted to the system shown in FIG. 1, in FIG. 2 a plurality of reference channels $RC_1-RC_n$ are provided in addition to the usual group of signal channels $SC_1-SC_n$, the outputs of which are supplied to the threshold detector TD, as in FIG. 1. The outputs of the reference channels are supplied to a summing network 16. There are N number of reference channels and the network 16 includes attenuating resistors $16a-16n$ so that the output of each channel is attenuated by a factor of N. The resistors $16a-16n$ are connected to a common output terminal 16S on which is impressed the sum $E_0$ of the outputs, $E_{S1}-E_{Sn}$, of the reference channels. In this manner the DC output of the summing network will be the same as the DC output of any one reference channel but the noise voltage output of the summing network will be reduced by a factor $1/\sqrt{N}$ relative to any one reference channel due to the fact that noncoherent noise adds according to the RMS value of the different voltages. The output of the network 16 is supplied to a suitable low pass filer 17, the bandwidth of which is equal to one half of the bandwidth $B_S$ of the signal channels. The purpose of this filter will be mentioned later. The output of the filter 17 is integrated in a postdetector integrator 18 and this integrated output voltage which is the desired reference voltage $E_R$ is supplied over conductor 19 to the threshold detector TD.

The various reference filters must not overlap on the frequency spectrum so that the noise output of the various reference detectors $D_R$ will be completely noncoherent. The reference filters should also be spaced from the Doppler frequency band so that no signals appear in the part of the spectrum used to develop voltages in the reference channels. The reference noise can be made arbitrarily small by increasing the number of reference channels because of the relation mentioned above. The tabulation in FIG. 2 shows the increase in system noise figure relative to a pure DC reference versus different values of N.

In the operation of the embodiment of the invention shown in FIG. 2, the integrated value of an impulse is the same in all the channels as is required to maintain the constant false alarm probability, but because of the difference in filter bandwidths, necessary to take care of the random noise signals, the impulse time function into the integrators is different in the reference channels from that in the signal channels. This can cause a difference in the integrated value of impulse in the two channels if the impulse occurs immediately before the integration period begins or ends because a different part of the impulse will be integrated into the two types of channels. This difficulty is overcome by the low pass filter 17 which is interposed between the summation points 16S of the summation network 16 and the integrator 18. This filter may be of conventional construction but should be the low-pass equivalent of a signal filter so that the impulse time function into all integrators is substantially the same.

Figure 3:
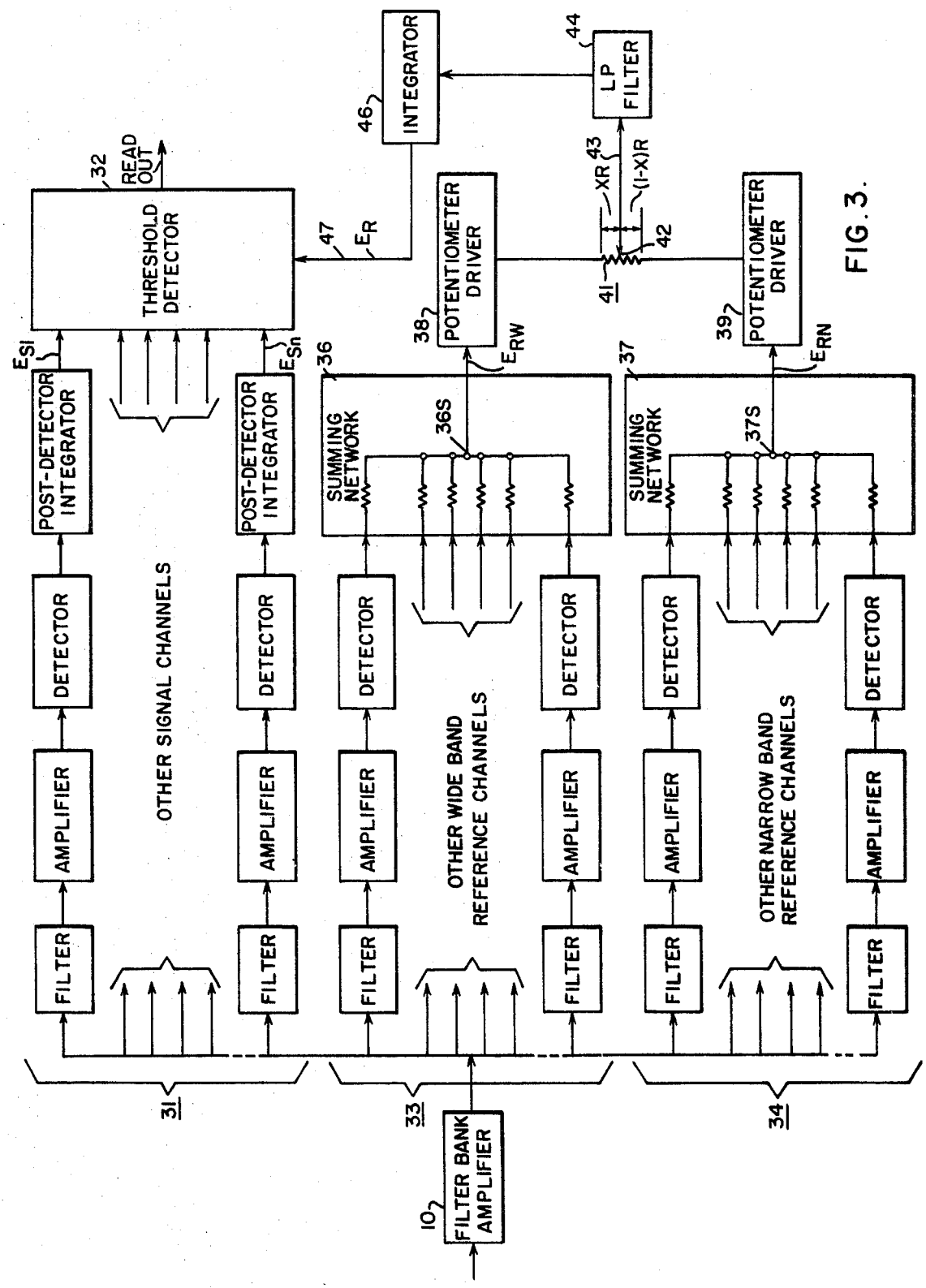
FIG. 3 is a schematic block circuit diagram of the circuit embodiment of the present invention.

The second embodiment of the invention in FIG. 3 provides means for varying the threshold ratio, T, without the necessity of simultaneously varying the bandwidth of each reference channel filter. It will be readily apparent that it would be difficult to simultaneously vary the bandwidth of multiple filters, particularly when crystal filters are used. The system illustrated in FIG. 3 provides a circuit which permits continuous control of the threshold ratio using fixed bandwidth filters while at the same time satisfying the requirements at any threshold setting for a constant false alarm probability for varying noise and impulse levels, or any combination of the two.

To this end, the embodiment of FIG. 3 includes the usual bank of signal channels indicated at 31, the outputs $E_{S_1}$—$E_{S_n}$ of which go to the usual threshold detector 32. As contrasted to the embodiment shown in FIG. 2 wherein there are a plurality of reference filter channels each having the same bandwidth $B_S$, in this second embodiment there are two groups of reference channels, one group designated at 33, each of which have a wide bandwidth, $B_{RW}$, and the other group designated at 34 each of which have a narrow bandwidth, $B_{RN}$. The bandwidth $B_{RW}$ of the wide bandwidth channels represents the maximum value of the desired threshold ratio while the bandwidth $B_{RN}$ of the narrow band reference channels represents the minimum value of the desired threshold ratio if such a system were to use variable bandwidth filters.

As in the previous instance the group 31 of signal channels are designed to be centered in the signal region of the echo spectrum while the wide and narrow reference filters, respectively, cover different parts of the Doppler echo spectrum that do not overlap so that their noise outputs are completely noncoherent. Also, the reference channels are located far enough from the center of the signal frequency that no target signals will appear in them. Then if $T_{max}$ and $T_{min}$ are the maximum and minimum, respectively, of the desired values of the threshold ratio then $$B_{RW} = {}^2_{max}B_S \text{ and} \qquad (3)$$

$$B_{RN} = {}^2_{min}B_S \qquad (4)$$

Each of the signal channel amplifiers, as in the previous embodiment, have the same gain as the reference amplifiers in order to satisfy the impulse response requirement previously discussed. The detectors are all identical in each of the channels as in the previous embodiment.

The output voltages $E_{RW}$ of the group of broad band reference filters 33, are supplied to a summing network 36, similar to the summing network 16 in FIG. 2. Likewise, the output voltages $E_{RN}$ of the group of narrow band reference filters 34 are supplied to a summing network 37, similar to the other summing network 36. The summing networks 36 and 37 attenuate each of the outputs of their corresponding groups of channels by a factor equal to the number of channels in their respective group. Accordingly, the DC output voltage $E_{RW}$ of network 36 at point 36S and the output $E_{RN}$ of network 37 at point 37S is equal to any one of the DC outputs of the individual channels but the noise output voltage is reduced by a factor equal to the square root of the number of channels being summed in each respective network. The output of each of the summing networks 36 and 37 is supplied to respective potentiometer drivers 38 and 39. These potentiometer drivers are amplifiers with low output impedances such as cathode or emitter followers. These drivers feed the opposite ends of a threshold control potentiometer 41, having a value of resistance R. A potentiometer arm 42 on the potentiometer 41 is connected through conductor 43 to the low pass equivalent of a signal filter 44 having a bandwidth equal to one half the bandwidth of the signal channels. The purpose of the filter 44 is to give impulses in the reference channels the same time response as in the signal channels to prevent integration errors when impulses occur just before the beginning or end of the integration period. The output of the filter 44 is connected to the postdetector integrator 46 where the signals are integrated and from which they are supplied to the threshold detector 32. The integrator 46 is similar in all respects to the postdetector integrators for the signal channels 31. The output of the integrator 46 on the conductor 47 constitutes the threshold reference voltage for the threshold detector 32.

In the operation of this embodiment the magnitude of the reference voltage on the conductor 47 and also the threshold ratio due to noise is controlled by the position of the arm 42 of the threshold potentiometer 41. When the potentiometer arm 42 is moved up toward the wide band end the reference voltage increases, and vice versa. However, the impulse response is not effected by the position of the arm 43, since as previously mentioned the integrated value of an impulse is independent of the bandwidth of the channel through which it passes.

From equations (3) and (4), it follows that $$T_{max} = \frac{E_{RW}}{E_s} = \sqrt{\frac{B_{RW}}{B_s}} \text{ when } X = 0 \qquad (5)$$

and $$T_{min} = \frac{E_{RN}}{E_s} = \sqrt{\frac{B_{RN}}{B_s}} \text{ when } X = 1 \qquad (6)$$

Therefore, the combined adjusted threshold ratio is $$T_C = \frac{E_R}{E_s} = \frac{(1-X)E_{RW}XE_{RN}}{E_s} \qquad (7)$$

It will be apparent that the potential output on the arm 42 is a weighted average between a group of reference channels which have a greater bandwidth than required and another group which have a smaller bandwidth than is required. Adjusting the potentiometer arm 42 has the same effect as changing the bandwidth of all of the reference channel filters.

It will be seen from the above description that the present invention provides a novel and simple automatic threshold control system with a constant false alarm probability which can be readily adjusted to meet any environment of random noise or impulse signals, or a combination of the two. The system has been built and successfully tested.

What I claim is:

1. Signal data retrieval apparatus for receiving signal data dispersed in a wide spectrum of frequencies including pulses and coherent and noncoherent frequencies of random phase and amplitude comprising, a receiver for receiving a wide spectrum of input signals including the desired signal spectrum and noise signals, a plurality of contiguous signal filter channels connected to said receiver, each channel having detector and postdetector integrator means and covering a desired signal band so that they separate the signal spectrum into discrete quantized segments, a plurality of reference voltage channels connected to said receiver and spaced from said signal channels and each including filter, amplifier, detector and postdetector integrator means, means for summing the instantaneous output voltages from said reference channels, a threshold detector, and means for supplying said signals from said signal channels to said threshold detector for causing a final output signal when the sum of the output signal voltages exceeds the sum of the reference voltages.

2. The combination as set forth in claim 1 in which the bandwidth of said reference channels is equal to $T^2 \times B_s$, where T is equal to the ratio of the output voltages of said reference channels to the output voltage of said signal channels in random noise environment and $B_s$ is the bandwidth of the signal channels, and the gain of said signal channels is equal to the gain of said reference channels.

3. The combination as set forth in claim 1 in which the output signal voltages from said signal channels are connected to said threshold detector as signal inputs and the outputs from said reference channels are connected to said threshold detector to apply a threshold bias to said detector.

4. The combination as set forth in claim 3 in which the bandwidth of said reference channels is a selected amount greater than the bandwidth of said signal channels, and the gain of said signal channel is equal to the gain of said reference channels.

5. The combination as set forth in claim 3 in which each reference channel includes an attenuating resistor, all of equal value, said resistors being connected to a common output terminal constituting a summing point, the gain of said signal channels being the same as that of said reference channels and the bandwidth of said reference channels being equal to the product of the threshold ratio squared times the bandwidth of said signal channels, the threshold ratio being the ratio of the sum of the output voltages of the reference channels to the output signal voltages of the signal channels.

6. The combination as set forth in claim 5, and an integrator connected between said filter and said threshold detector.

7. The combination as set forth in claim 3 wherein there are two groups of reference channels, all of said channels of each group having the same bandwidth, the bandwidth of one group being much wider than the bandwidth of the other group, a summation network for each network including an attenuating resistor for each channel of the respective group so that the noise voltage output of each summing network will be reduced by a factor of $1/\sqrt{N}$ where $N$ is the number of channels in the respective group, the gain of said signal channels being equal to the gain of the reference channels, a low impedance output circuit for each network, a potential divider connected between said circuits, and means for supplying an output potential from said potentiometer to said threshold detector to bias the latter.

8. The combination as set forth in claim 7 in which there is a low pass filter connected between said potentiometer and said threshold detector.

9. The combination as set forth in claim 7, the relation of the bandwidths of the reference channels to the signal channels is $$B_{RW} = T^2_{max} \cdot B_S$$

$$B_{RW} = T^2_{min} \cdot B_S$$

where $B_{RW}$ is the bandwidth of the wide reference channels, $B_{RN}$ is the bandwidth of the narrow reference channels, $T_{max}$ and $T_{min}$ are the threshold ratios for maximum the wide and narrow band reference channels, respectively, and $B_S$ is the bandwidth of the signal channels.

10. The combination as set forth in claim 3 in which the bandwidth of said reference channels is much greater than the bandwidth of said signal channels.

11. The combination as set forth in claim 10, and a low pass filter having a bandwidth equal to one half of the bandwidth of said signal channels connected between said summing point and said threshold detector.

12. The combination as set forth in claim 11, including an integrator connected between said low pass filter and said threshold detector.